E. J. CROCKETT.
RECEPTACLE.
APPLICATION FILED MAR. 17, 1915. RENEWED SEPT. 27, 1917.
1,263,646. Patented Apr. 23, 1918.
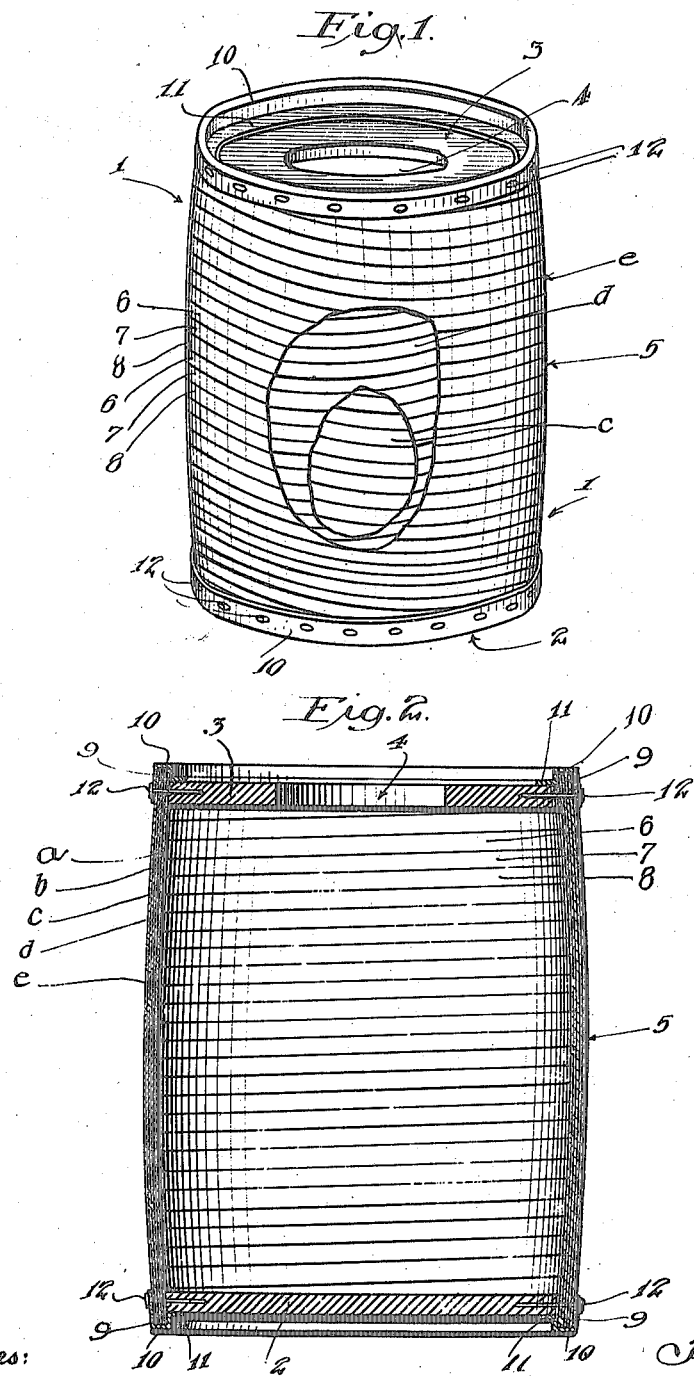
Witnesses:
Inventor
Ernest J. Crockett
By 
Attys.

UNITED STATES PATENT OFFICE.

ERNEST J. CROCKETT, OF LOS ANGELES, CALIFORNIA, ASSIGNOR, BY MESNE ASSIGN-
MENTS, OF ONE-HALF TO A. M. YOUNG AND ONE-HALF TO G. JOHNSON RITTENHOUSE,
BOTH OF LOS ANGELES, CALIFORNIA.

RECEPTACLE.

1,263,646.     Specification of Letters Patent.     Patented Apr. 23, 1918.

Application filed March 17, 1915, Serial No. 14,913.   Renewed September 27, 1917. Serial No. 193,608.

*To all whom it may concern:*

Be it known that I, ERNEST J. CROCKETT, a citizen of the United States, residing at Los Angeles, in the county of Los Angeles and State of California, have invented a new and useful Receptacle, of which the following is a specification.

An important object of this invention is the production of a new article of manufacture in the form of a receptacle for liquids and solids, said receptacle being manufactured of inexpensive material and being of great strength even though some of the material used in its manufacture is, in itself, previous to its incorporation in the manufactured article incapable of withstanding great strains.

Another object is the production of a receptacle formed of strip material, wound or arranged in such manner as to make the receptacle of maximum strength and minimum liability to leak.

Another object is to produce an article of this description having surfaces of maximum smoothness inside and outside.

Other objects and advantages may appear from the subjoined detail description.

The accompanying drawings illustrate the invention.

Figure 1 is a perspective view of a receptacle constructed in accordance with the provisions of this invention, some of the turns of the outer layer being partly broken away to expose portions of the next inner layer.

Fig. 2 is a vertical mid section of Fig. 1.

The invention is not limited to the exact form of structure shown in the drawings, it being understood that some features of the invention are of importance whether the article be termed a tub, a barrel, or other hollow body capable of being manufactured in accordance with this invention.

In the instance shown in the drawings, the receptacle 1 is in the form of a barrel or keg having two heads, one head forming a bottom 2 and the other head forming a top 3. The top 3 may be solid or may be provided with an opening 4. The receptacle 1 may be provided at its middle with a bulge 5, as is usual in cooperage, to facilitate handling of the receptacle when the same is filled with heavy material.

The peripheral wall of the receptacle 1 is formed of any suitable number of strips of overlapping strip material wound in helical turns from end to end of the receptacle to form a tubular body composed of superposed layers of any desired number according to the strength of the receptacle desired and in accordance with the character of the material to be held by the receptacle. In the instance shown, there are three such strips 6, 7, 8 lying side by side with abutting edges and there are five such layers, an inner layer $a$, intermediate layers $b$, $c$, $d$, and an outer layer $e$.

The helical turns in one of said layers diagonally cross the helical turns in another of said layers, that is to say, the alternate layers $a$, $c$, and $e$ have their helical turns wound aslant toward one end of the receptacle and the alternate layers $b$, $d$ have their helical turns wound aslant toward the opposite end of the receptacle.

The strips 6, 7 8 may be of fibrous material such, for instance, as paper of any suitable quality.

From the foregoing it is clear that the different layers are perfectly smooth so that the inside and outside surfaces of the receptacle are quite smooth.

The strips may be of any suitable width and in practice I have used strips one inch in width, and have employed three separate continuous strips wound together edge to edge to and fro from end to end of the receptacle so that the turns in one layer will overlap the turns in the next succeeding layer. The strips may be wound over a suitable form or core, not shown, to facilitate manufacture of the article.

The winding of the strips so as to arrange them as above described may be accomplished by any suitable mechanism such, for instance, as the mechanism shown, described and claimed in my copending application for receptacle making machine, filed; and the process employed in making the receptacle is the subject of my copending application for method of making receptacles, filed March 30, 1915, Serial No. 18,002.

In practice as the strips are wound in place, said strips will be coated with a suitable composition such as glue, silicate of soda, and alum so as to add to the strength of the structure and make the same proof against fire and penetration by liquids.

The tubular body formed by the strips 6, 7, 8 is firmly attached to the heads 2, 3 by suitable means, and in this instance for this purpose the tubular body extends outward beyond the heads to form annular tongues 9 which fit into channeled metal rims 10 having flanges 11 that seat against the outer faces of said heads. The rims 10 are fastened in place by nails 12 or the like which pass through the rims, strips and into the edges of the heads 2, 3.

The receptacle is made as follows:

One of the heads 2, 3 is placed in position, and a form or core, not shown, is placed against said head. Then a strip or strips of material such as paper or the like, are coated with a suitable compound such as that hereinbefore described and are wound in a spiral or spirals over the edge of said head and around the core to the opposite end of said core to form the first or inner layer.

When the first layer is completed then the slant of the winding of the strips is reversed so that the helix progresses toward the head to form a second layer and when said second layer is completed then the direction of the progression of the helix is again reversed to form a third layer, and so on, the strips being wound to and fro until the desired number of layers have been formed.

The core is then removed or the hollow body thus produced is removed from the core, and the strips are cut to leave the annular tongue 9. Then the other head is placed in position and the rims 10 are fastened in place over the tongues 9 to complete the receptacle.

What I claim is:

A receptacle comprising a body formed of superposed layers of helical turns of strip material, the helical turns increasing in diameter from the ends of the body toward the middle portion of said body, the superposed layers extending beyond the outer face of the head to form an annular tongue, and a rim provided with a groove to receive the annular tongue and fastened to the tongue and head.

In testimony whereof I have hereunto set my hand at Los Angeles, California, this 11th day of March, 1915.

ERNEST J. CROCKETT.

In presence of—
GEORGE H. HILES,
LORA M. BOWERS.